United States Patent [19]

Komori et al.

[11] 4,180,798

[45] Dec. 25, 1979

[54] CHARACTER RECOGNITION AND COMMUNICATION SYSTEM

[75] Inventors: Kazuaki Komori, Yokosuka; Hirofumi Kaiyoh, Kanagawa, both of Japan

[73] Assignee: Nippon Telegraph & Telephone Public Corporation, Tokyo, Japan

[21] Appl. No.: 874,827

[22] Filed: Feb. 3, 1978

[30] Foreign Application Priority Data

Feb. 9, 1977 [JP] Japan ................... 52-13298

[51] Int. Cl.$^2$ ............................................. G06K 9/00
[52] U.S. Cl. ............................. 340/146.3 H; 358/256
[58] Field of Search ................. 340/146.3 H, 146.3 R, 340/146.3 E, 146.3 MA, 146.3 AH, 146.3 AC; 358/256, 263

[56] References Cited

U.S. PATENT DOCUMENTS

| | | | |
|---|---|---|---|
| 3,200,194 | 8/1965 | Raminow | 340/146.3 H |
| 3,487,371 | 12/1969 | Frank | 340/146.3 H |
| 3,582,884 | 6/1971 | Shepard | 340/146.3 H |
| 3,764,980 | 10/1973 | Dansac et al. | 340/146.3 D |
| 3,895,350 | 7/1975 | De Vries | 340/146.3 D |
| 3,949,363 | 4/1976 | Holm | 340/146.3 D |
| 4,032,887 | 6/1977 | Roberts | 340/146.3 D |

Primary Examiner—Leo H. Boudreau
Attorney, Agent, or Firm—Frishauf, Holtz, Goodman & Woodward

[57] ABSTRACT

A character recognition and communication system, wherein a character appearing on a document is converted into a character image signal at a transmission terminal including, for example, a facsimile scanner and transmitted to the prescribed center, after the character represented by the image signal is identified by a communication network including switching equipment; the communication network comprises a plurality of switching units, and the corresponding recognition control units and character recognition units all scattered throughout said network and connected together by a common interconnection circuit; and the plural character recognition units recognize characters by different processes, have a complementary relationship with each other and recognize with high precision various kinds of characters supplied from a plurality of terminals and transmit the recognized characters to the corresponding centers.

7 Claims, 11 Drawing Figures

CHARACTER RECOGNITION AND COMMUNICATION SYSTEM

BACKGROUND OF THE INVENTION

This invention relates to a character recognition and communication system which can recognize various kinds of characters with high precision and at low cost. An optical character reader (abbreviated as "OCR") is very useful for a data transmission system. M. D. Freedman describes an OCR for reading printed characters ("Optical Character Recognition", IEEE Spectrum, March, 1974). An OCR for reading hand-written characters generally uses a different character-recognizing process from the case of reading printed characters, but may be represented broadly by the broadly same block circuit diagram.

FIG. 1 is a schematic block circuit diagram of an ordinary character reader. A scanning unit 1 undertakes the transport of a document, the scanning and photoelectric conversion of a character appearing on a document, and normally the digitalization (mainly binarization) of a scanning signal. A recognition unit 2 comprises three blocks, namely, a preprocessing unit 3 for detecting a character pattern requiring recognition from a signal received from the scanning unit 1, eliminating noises, and normalizing the size of the pattern and its inclination; a feature extraction unit 4 for extracting effective features from the preprocessed character pattern for correct recognition thereof; and a discrimination unit 5 for distinguishing the category to which an input character belongs by reference to a dictionary memory which is supposedly supplied with the corresponding character.

The greatest problems now confronting the development of a character reader are its recognition performance and cost. The recognition performance can be expressed by reference to the font to which a character requiring recognition belongs and on the basis of recognition precision. The OCR developed to date, however, has the following drawbacks:

(1) Where a relatively small amount of data (for example, a relatively small number of documents) is to be treated by an OCR, then this apparatus must be of correspondingly low cost. Customary practice to meet this requirement is to slow down the treating speed and somewhat sacrifice the recognition performance. Consequently characters typed or hand-written on a document are subject to rigid restrictions in respect of the shape and the density, to render the OCR practically available, though it may have a low recognition performance.

(2) The OCR has a far lower capacity to recognize characters than the human ability, though a great deal of effort has been directed to its improvement. Various character-recognizing processes adopted by the OCR have merits and demerits with respect to the shape of characters requiring recognition.

For resolution of the above-mentioned problems, the following processes have hitherto been contemplated or put into practice.

(i) "Pattern Recognition Techniques", by J. R. Ullmann, Butterworth & Co., Ltd., 1973, pp. 1 to 21.

This reference describes various forms of a mask-matching process with a character regarded as a sort of type. The method of said reference is adapted to recognize characters little varying in shape, for example, printed characters.

(ii) U.K. Pat. No. 1,180,290, February, 1970 (H. Genchi).

The method of this reference is based on the detection of the edges of a character pattern. Namely, the method recognizes a character by extracting the topological features of a character such as the loops, concave, convex and parallel segments of character strokes and examining the sequence in which these topological features appear when a character pattern is viewed from the top to the bottom.

(iii) Y. Fujimoto et al, Recognition of Handprinted Characters by Nonlinear Elastic Matching (3rd International Joint Conference on Pattern Recognition, November, 1976).

The method of this reference skeletonizes character strokes, expresses the skeletonized character strokes in a chain of direction codes, processes these chained direction codes to extract the topological features of a character, such as loops and the inclinations of limbs, and finally recognizes an input character by comparison with a standard pattern.

(iv) H. A. Glucksman, Multicategory Classification of Patterns Represented by Higher Order Vectors of Multilevel Measurements, IEEE Trans. on Computers (C-20, No. 12, December, 1971, pp. 1,593 to 1,598).

The method of this reference recognizes a character by encoding various points on the character background by reference to the frequency at which scanning lines extending from the points in every direction are intersected by character strokes, and comparing the coded points with those obtained from a standard pattern.

Many other character recognition methods have already been proposed. For instance, various character recognition methods are set forth on the pages 168 to 232 to the aforesaid book written by J. R. Ullman. These prior art methods use different processes in observing and treating a character pattern. Therefore, it sometimes happens that, some methods correctly recognize a given character, while the other methods reject it or wrongly read it. With another character, opposite results of observation are sometimes given by the conventional recognition methods, as naturally expected. U.S. Pat. No. 3,895,350 (Willem) describes an OCR of high recognition performance which comprises a plurality of scanning units using different scanning processes or a plurality of recognition units applying different recognition processes and wherein comparison is made between the results of observation to elevate recognition performance.

(3) U.S. Pat. No. 3,582,884 (David H. Shepard) discloses a character reader wherein a plurality of scanning units are connected to the corresponding expensive recognition units. According to this patent, a plurality of exclusive scanning units are connected to a character-reading center through the corresponding channels. Scanning of a document and transmission of a character pattern signal are carried out with the operation of the scanning units controlled by the center. A transmitted character pattern signal is further treated by a recognition unit disposed in the center and connected to a calculator.

Apart from a high speed OCR designed to read a large amount of data appearing, for example, on documents, an OCR which could read various kinds of characters with high precision would be very useful even in the case of treating a relatively small amount of data, though the processing speed might be low. Document data supplied to an OCR generally includes different kinds of characters (such as digits, English letters, square form of Japanese alphabet, printed or hand-written characters) and is further subject to different limits to wrong reading (recognition precision) according to the type of business in which documents are handled. This tendency is prominent particularly where a small number of documents of various forms are handled.

Therefore, the known techniques of reading characters have the following drawbacks from the point of view of reading characters by an inexpensive process.

(a) A system previously described under item (1) is applicable where an input character has a relatively good form. Otherwise, rejection of reading or wrong reading often arises to increase an operator's work, rendering an OCR little available for use or giving rise to higher operation cost.

(b) A system previously referred to under item (2) can indeed recognize characters with high precision, but presents problems from the economic standpoint, where only a small amount of data is supplied.

(c) A system previously discussed under item (3) comprises a recognition unit connected to a large number of scanning units. Therefore, it will be economically possible to provide a plurality of such recognition units capable of effecting considerably high recognition performance, as in the case of (2). In this case, however, character recognition operation is carried out uniformly with respect to all forms of input characters. Namely, the system fails to recognize characters in a manner adapted for the contents of a document, thus still raising problems in respect of cost. Further, the system must include a large number of terminals to be rendered economically feasible. Where, however, the terminals are distributed geographically over a broad area, then communication cost will increase, thus imposing limitations on the application of the system. If, in this case, the terminals and the corresponding centers were connected by, for example, the existing telephone switching network, then a large amount of image signals could be transmitted to the centers. Particularly, however, where these image signals are transmitted through plural stages of switching units, traffic unbalance will take place in said telephone switching network, exerting a harmful effect on communications between the other terminals, such as telephones or data terminals.

Any one of the known character recognition systems is capable of recognizing characters by the same process with high precision and at low cost and transmitting a recognized character to the center from the respective terminals. However, the prior art fails to recognize various forms of characters economically and efficiently by applying different recognition processes in compliance with the demand of a terminal user.

It is accordingly the object of this invention to provide a character recognition and communication system which is improved in respect of the drawbacks accompanying the prior art and can read various forms of characters with high precision and at low cost.

SUMMARY OF THE INVENTION

To this end, the invention provides a character recognition and communication system wherein a character transmitting system comprises a plurality of terminals transmitting an image signal; a communication network for recognizing a character represented by an image signal supplied from the respective terminals; and a center specified by any of said terminals and supplied with an image signal whose character has been recognized by the communication network, and wherein the communication network comprises a plurality of switching units connected to the respective terminals and joined together by an interconnection circuit; and a plurality of recognition control units and character recognition units provided correspondingly to the respective switching units, designed to recognize characters by different processes, mutually connected in complementary relationship, and scattered throughout the communication network.

With a character recognition and communication system embodying this invention, an inexpensive device such as a facsimile scanner is provided for the scanning unit of the respective terminals. A plurality of character recognition units scattered throughout the communication network jointly recognize in complementary relationship characters of documents delivered from the plural terminals, thus making it possible to share the hardware material for recognition and improve the efficiency of using the communication network. Therefore, the present character recognition and communication system has the advantages that various kinds of characters can be recognized with high precision and at low cost; and character recognition units scattered throughout the communication network can be interchanged or additionally installed independently of the terminals, thus rendering the whole system highly versatile.

DETAILED DESCRIPTION

Figure 2:
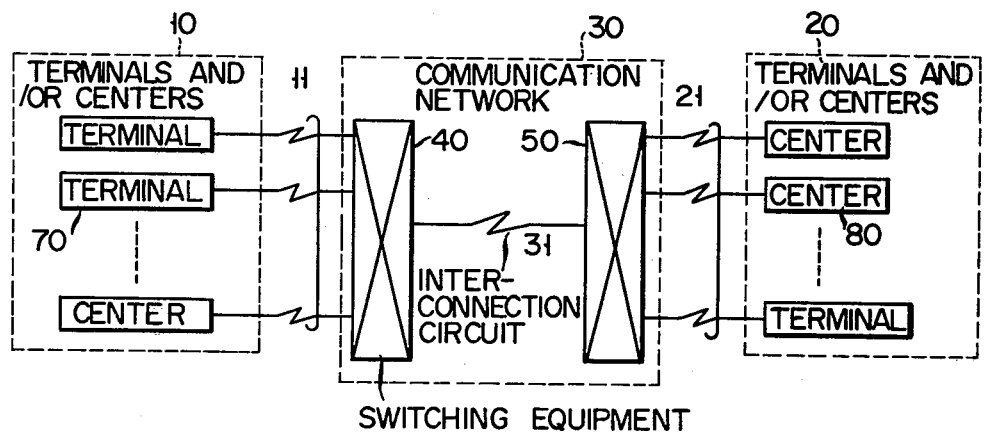
FIG. 2 is a schematic block circuit diagram of the ordinary data communication system.

A communication network 30 includes an assembly of switching circuits and interconnection circuits connecting said switching circuits together for simplification of representation, FIG. 2 only shows two switching units 40, 50, that is, the switching unit 40 receiving a communication line 11, the switching unit 50 receiving a communication line 21 and an interconnection circuit 31 connecting both switching units 40, 50. There will now be described the process by which character data is transmitted and received between the respective terminals and corresponding centers of the character recognition and communication system of this invention. Now let it be assumed that character data is transmitted from a terminal 70 included in a group 10 of terminals and/or centers to a center 80 included in another group 20 of terminals and/or centers. An operator at the terminal 70 dials an operator at the opposite center 80. When connection is established between the terminal 70 and center 80, then character data at the terminal 70 is transmitted through the communication line 11, switching unit 40, interconnection circuit 40, switching unit 50 and communication line 21 to the center 80 where the character data is processed.

Figure 3:
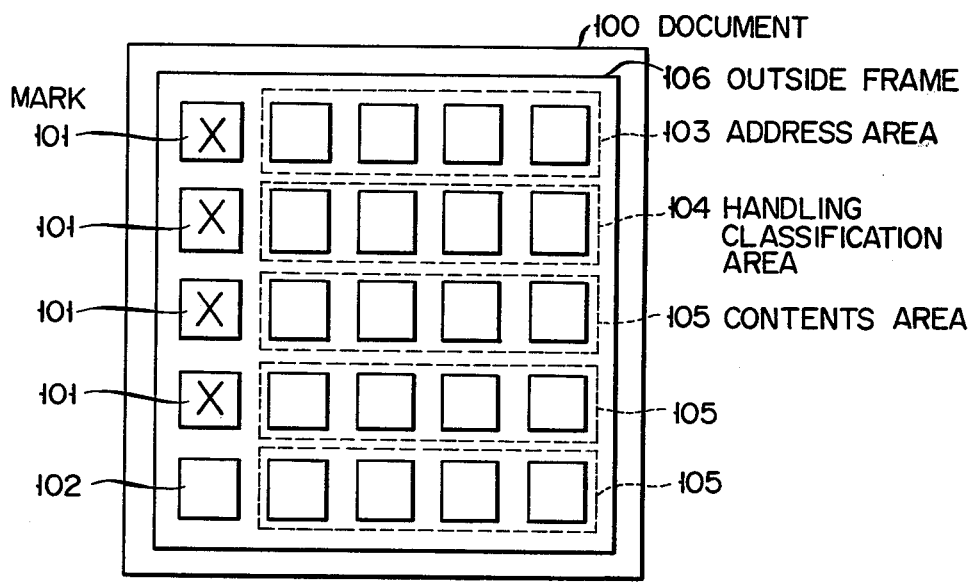
FIG. 3 illustrates a format of a document handled by a character recognition and communication system embodying this invention.

FIG. 3 illustrates a format of a document used with the character recognition and communication system of this invention. Referential numeral 100 denotes a document; 101 is a mark indicating a line in which character recognition is to be carried out; 102 is a mark indicating a line in which character recognition used not be undertaken; 103 expresses frames in which data on the name of an address are entered, that is, the center 80; 104 expresses frames in which data on the handling classification of a document are entered; 105 expresses frames in which the contents of a document are entered; and 106 is the outside frame line of a document. FIG. 3 illustrates a document in which handwritten characters are recorded. It is assumed that the frame line 106 and the solid line blocks enclosed in said frame line 106 in which marks and characters are to be entered are preprinted; the frame line 106 is printed in black; the other lines are printed in colors invisible to a scanning unit; and the frame line 106, mark frames and character frames have the prescribed relative positions.

Where a document has printed characters, the mark 101 is expressed, for example, by a letter "X" with the prescribed space allowed with respect to the frame line 106. Data to be entered in a document is printed in the blocks 103, 104, 105 arranged on the same line as the mark "X". The above-mentioned document bearing printed characters can obviously be handled as easily as a document bearing handwritten characters.

Referring to the frame 104 indicating the handling classification of a document, it is assumed that the first frame following the mark 101 expressed by a letter "X" is impressed with a notation denoting the degree of reading precision, namely, a notation, for example, "0" indicating the ordinary degree of reading precision demanded on a character recognition unit, or a notation, for example, "1" showing the high degree of reading precision demanded of said character recognition unit. The second and following frames are impressed with data on the font of characters constituting the contents of a document 105. An indication in the second frame corresponds to the first line of the contents of the document 105, an indication in the third frame corresponds to the second line of the contents of the document 105, and so forth. Digits are used to indicate the font of characters. A digit "1" denotes that the characters are formed of numerals alone. A digit "2" indicates that the characters are formed of a combination of alphabetical characters and numerals. A digit "3" shows that the characters are formed of a combination of katakana (Japanese phonetic characters) and numerals. A digit "4" implies that the characters are formed of a combination of hiragana (another Japanese phonetic characters) and numerals. A digit "0" shows that character reading is not required. The following description is made on this basis. Characters appearing in the frame 104 indicating the handling classification of a document are chosen to be such digits as are written with sufficient care to be readily recognizable by any character recognition process.

Figure 4:
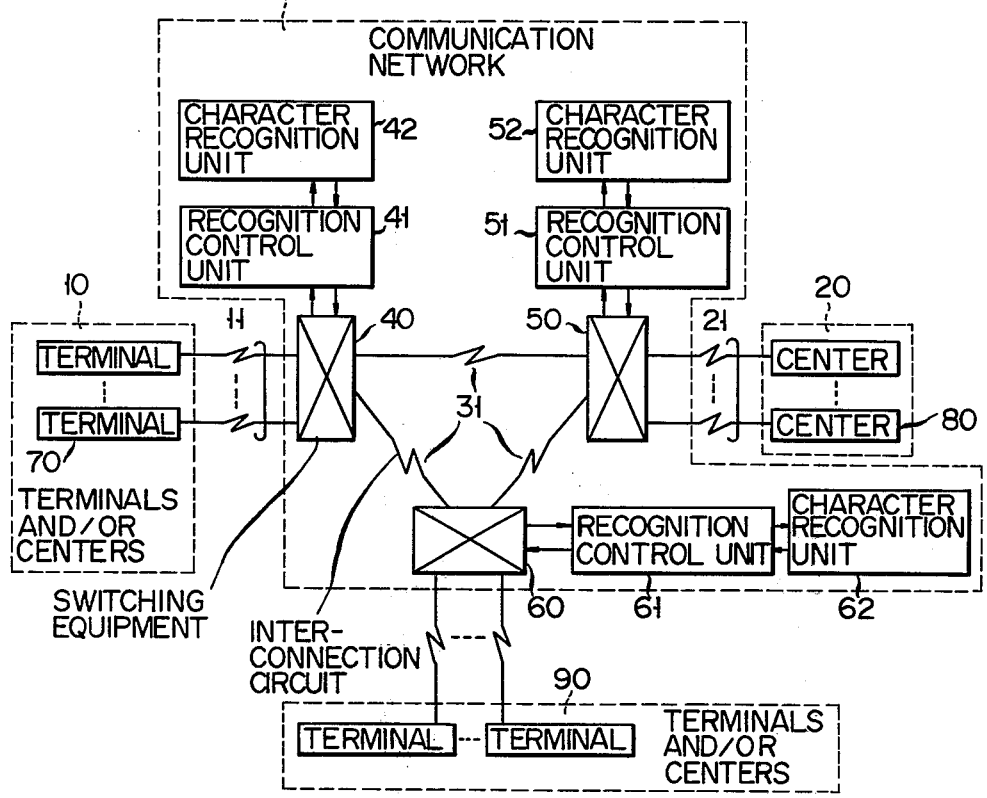
FIG. 4 is a block circuit diagram of a character recognition and communication system embodying this invention.

There will now be detailed this invention by reference to the accompanying drawings. FIG. 4 is a block circuit diagram of a character recognition and communication system. For simplification of representation, a communication network 30 is indicated to include three switching units. The parts of FIG. 4 the same as those of FIG. 2 are denoted by the same numerals, description thereof being omitted. Referential numeral 60 is a switching unit; 41, 51, 61 are recognition control units connected to switching units 40, 50, 60; 42, 52, 62 are character recognition units connected to said recognition control units 41, 51, 61, and the recognition control units 41, 51, 61 are mutually of the same arrangement; 90 denotes a group of terminals or centers.

(1) There will now be described by reference to FIG. 4 the arrangement and operation of a character recognition and communication system embodying this invention which can read characters with high precision. Now let it be assumed that part of the contents of a document is transmitted to the center 80 in the code form from the terminal 70 of, for example, a facsimile scanner corresponding to the scanning unit 1 of FIG. 1. Facsimile is a process of transmitting an image between human beings or telecommunication terminal users. Already known is that type of a facsimile which is carried out by means of a telephone switching network. The character recognition and communication system of this invention can be manufactured at low cost by applying such general purpose facsimile device as a scanner. The present invention makes it possible to utilize a facsimile, a process of carrying out communication between human beings in establishing communication between the human being and machine, thereby broadening the scope of application for while the facsimile is originally intended.

Figure 5:
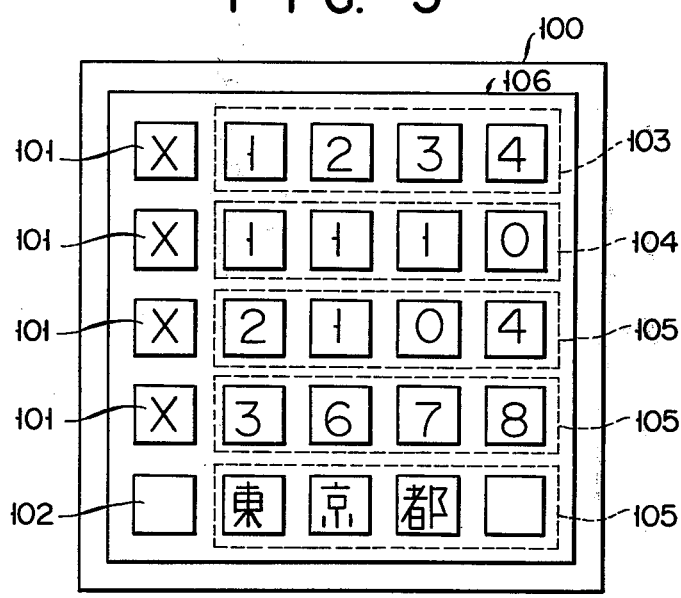
FIG. 5 indicates a format in which characters are entered in a document handled by the embodiment of the invention.

FIG. 5 illustrates a format in which characters are entered in a document handled by the embodiment of this invention. With this document, it is demanded to read only digits with high precision and transmit the results of said reading to the center 80 where said results are indicated in the form of digits, for example, "1", "2", "3" and "4". There will now be described two groups of units of different types and mutually complementary relationship for recognizing digits and marks. Referring to FIG. 4, a selected character recognition unit 52 is that of the numerous character recognition units included in the communication network which has the above-mentioned complementary relationship with a character recognition unit 42 immediately facing the terminal 70.

Before transmitting the data of a document to the center 80, an operator at the terminal 70 of FIG. 4 establishes connection between the recognition control unit 41 and said terminal 70 by dialing a telephone through a telephone switching unit 40. When the recognition control unit 41 and terminal 70 are connected by means of the switching unit 40, then the terminal converts the input characters of the document 100 of FIG. 5 into electric signals, which are transmitted to the recognition control unit 41 through the switching unit 40. In this embodiment, the terminal 70 is formed of a facsimile transmitter generally connected to a telephone switching network.

Figure 6:
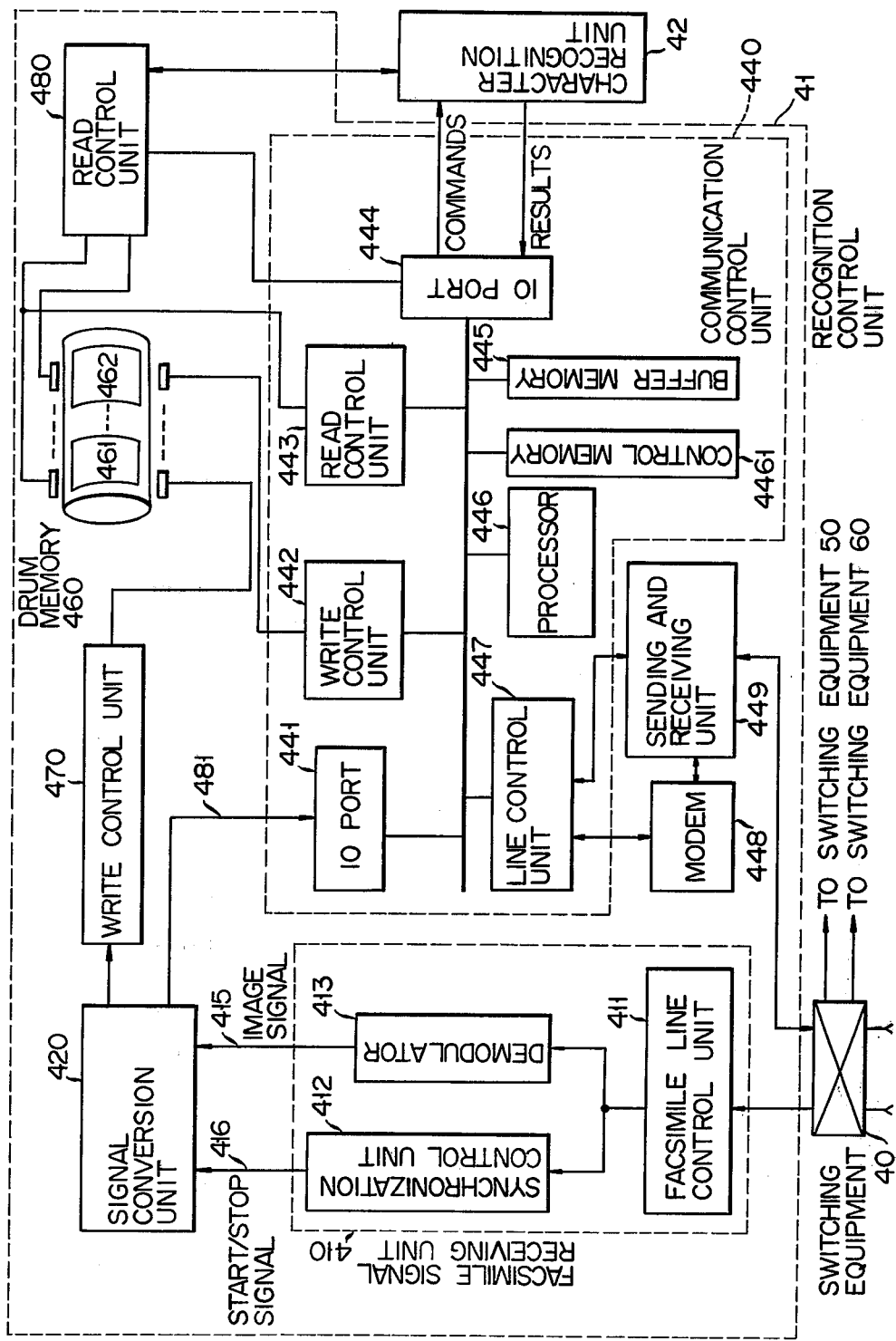
FIG. 6 is a block circuit diagram of the recognition control unit included in the embodiment of the invention.

FIG. 6 shows a concrete arrangement of the recognition control unit 41. An image signal delivered from the terminal 70 of FIG. 4 is transmitted to a facsimile signal receiving unit 410, where an image signal required for recognition of a character and a control signal are extracted. The facsimile signal receiving unit 410 has substantially the same arrangement as a facsimile receiver corresponding to the above-mentioned facsimile transmitter, except that said facsimile signal receiving unit 410 is not capable of recording the data of a document. A signal extracted by the facsimile receiving unit 410 is formed of an image signal representing a character of the document 100 transmitted from the terminal 70 and a start-stop signal indicating the section of an image signal now being detected. Both types of signals are conducted to lines 415, 416 respectively. An image signal supplied to the line 415 is a demodulated output from a demodulator 413. A start-stop signal sent forth to the line 416 in an output from a synchronization control unit 412. The start-stop signal is issued in a certain length of time after rotation synchronization and phase synchronization are effected between the terminal 70 and synchronization control unit 412 ahead of transmission of an image signal and ceases to be delivered when an image signal is cleared. An image signal supplied to the line 415 is converted into a code by a signal conversion unit 420 and stored in a drum memory 460 through a write-control unit 470 of said memory 460.

Figure 7:
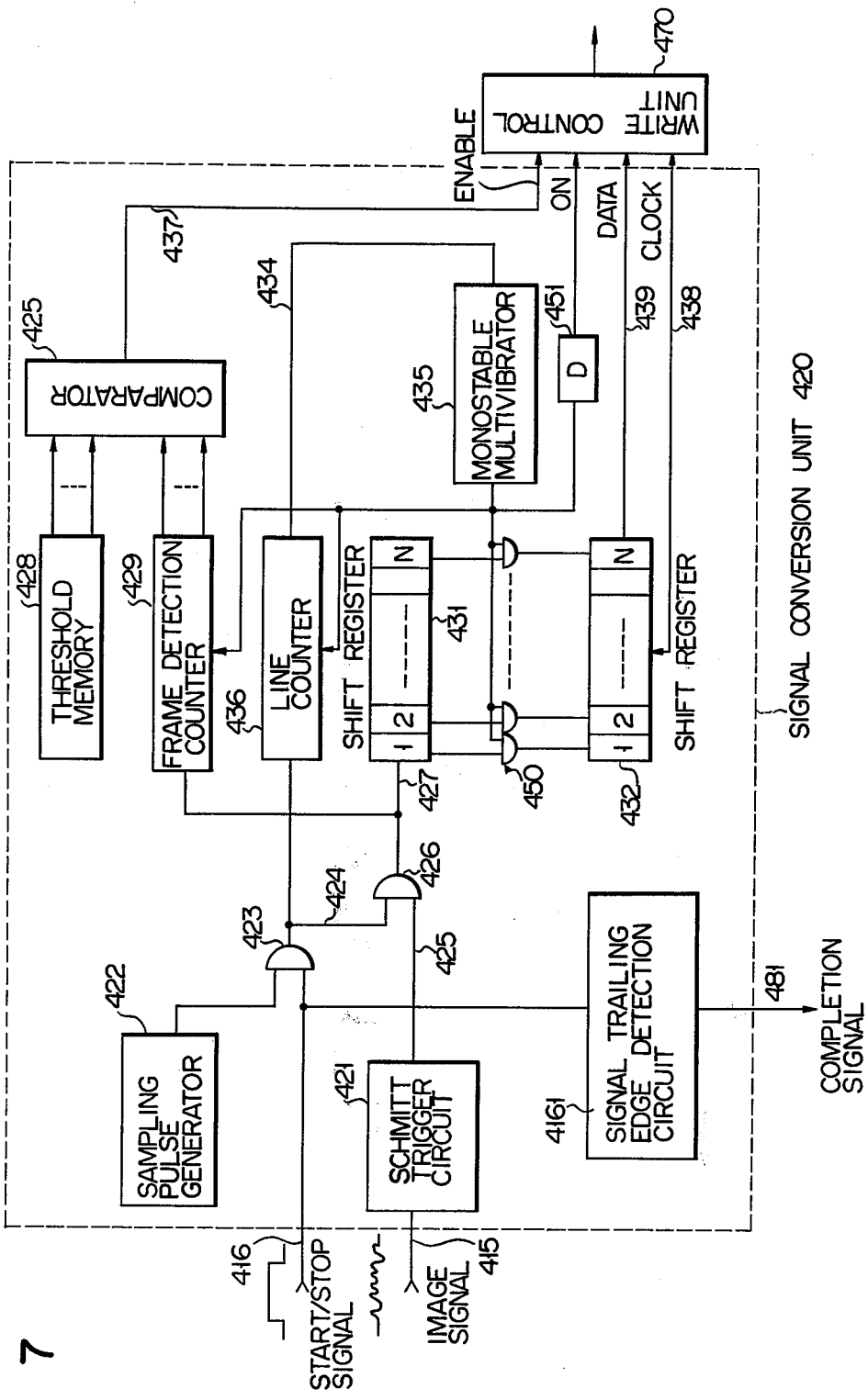
FIG. 7 is a block circuit diagram of a signal conversion unit included in the embodiment of the invention.

FIG. 7 illustrates a concrete arrangement of the signal conversion unit 420. Where the line 416 sends forth a start-stop signal previously supplied from the facsimile signal receiving unit 410, then an output from a sampling pulse generator 422 is conducted to a line 424 through an AND circuit 423. An image signal supplied to the line 415 is converted by a Schmitt trigger circuit 421 into a binary code "1" (denoting the black points of a document) and a binary code "0" (representing the white points and drop out color area of the document) on the basis of the prescribed threshold level. The converted signal is supplied to the line 425, and further sampled in an AND circuit 426 by a signal supplied from a sampling pulse generator 422 to a line 424. Sampled signals represented by a binary code are successively stored in a shift register 431 through a line 427. A sampling pulse from the line 424 is delivered to a line counter 36, where sampled signals having a number N corresponding to a length of one main scanning time of a facsimile device are counted. The following description is made on the assumption that in the embodiment of this invention, a main scanning time at the terminal 70 is fixed. When the line counter 436 completes the counting of N number of sample signals, then a line 434 is rendered conducting. An image signal from the line 427 is supplied to the shift register 431, and also to a frame detection counter 429 provided to detect a horizontal line on the outside frame 106 of the document 100. The frame detection counter 429 counts a number of sampled signals of binary code "1" (representing the black points of the document) obtained during one main scanning time. In the embodiment of this invention, the outside frame of the document 100 is printed in black lines. Comparison is made by a comparator 425 between an output from the frame detection counter 429 and an output from a threshold memory 428 holding a prescribed value M. When the output from the frame detection counter 429 is determined by comparison to have a large value than said prescribed value M, then this event is taken to mean that the horizontal line on the outside frame 106 of the document has been detected. As the result, an output line 437 of the comparator 425 is kept conducting. The value M, though theoretically equal to the maximum number N, is optionally determined in this case for precaution against unstable scanning at the terminal 70, errors in the conversion of signals into a binary code in the Schmitt trigger circuit 421 and noises possibly carried into an image signal. A signal supplied to the line 434 upon completion of the counting of the N number of sampled signals by the line counter 436 actuates a monostable multivibrator 435 to generate a strobe signal, thereby causing the contents of the shift register 431 to be transferred in parallel to the shift register 432 through a group of AND circuits 450. The strobe signal also resets the line counter 436 and frame detection counter 429, and further notifies to a write control unit 470 through a delay circuit 451 that data has been fully stored in the shift register 432. As the result, the write control unit 470 sends forth a clock signal to the line 438, provided the line 437 is rendered conducting, thereby causing shifting to take place in the shift register 432. Accordingly, the area 461 (FIG. 6) of the drum memory 460 is supplied through a line 439 with an N number of bits corresponding to one main scanning time. The above-mentioned operation is repeated while an image signal continues to be transmitted from the terminal 70. When the terminal 70 ceases to transmit an image signal and the line 416 does not send forth a start-stop signal, then a completion signal is delivered by a signal trailing edge detection circuit 4161 to a communication control unit 440 through a line 481. At this time, the operation of the signal conversion unit 420 stops. Signals representing a section below the upper horizontal line on the outside frame 106 of the document 100 which have been transmitted from the terminal 70 are stored in the area 461 of the drum memory 460 in the form of an image pattern expressed by a binary code of "1" or "0".

A sampling pulse generator 422 of FIG. 7 is generally referred to as a pulse generator. The other circuits, counter, shift register, comparator are also of the type already known to electronic circuit technique.

Figure 8:
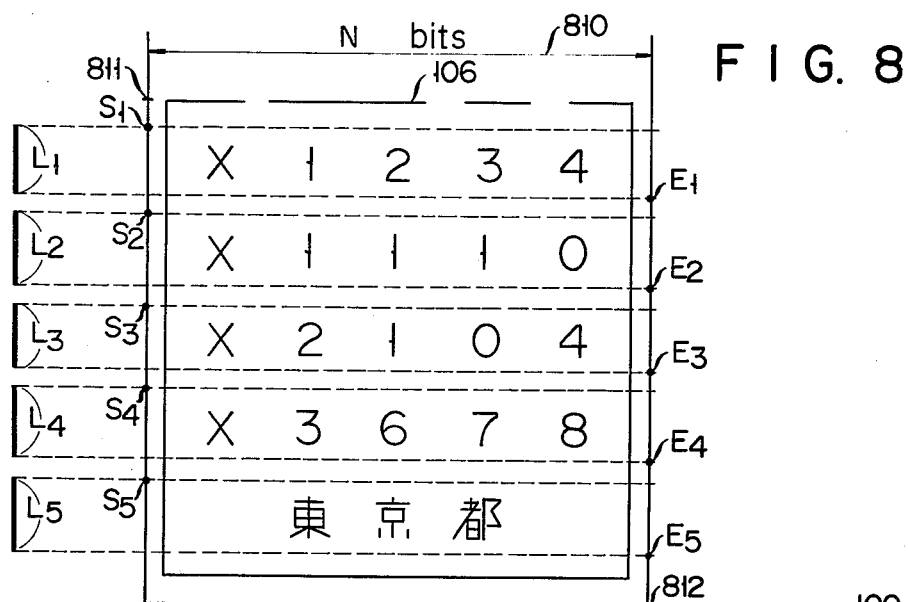
FIG. 8 shows a format in which characters are recorded in a document handled by the embodiment of the invention.

There will now be described the process of transmitting an image pattern stored in the area 461 of the drum memory 460 to the character recognition unit 42. Prior to this description, however, reference is made for better understanding to the manner in which an image signal is stored in the drum memory 460. Marks and characters are stored in the prescribed bounds of the area 461 of the drum memory 460. FIG. 8 shows the image pattern in which the data of the document of FIG. 5 is stored in the area 461 of the drum memory 460. In this case, it is assumed that mark frames and character frames are printed in drop out color. Therefore, these blocks corresponding to the frames are stored in the drum memory 460 in the form of a blank (white points) represented by a binary code "0". Referring to FIG. 8, indication of cuts in an image pattern representing an upper horizontal line on the outside frame 106 of the document 100 implies by way of precaution that such event possibly occurs when an image pattern denoting the horizontal line begins to be written in the area 461 of the drum memory 460 after detected by the comparator 425 of FIG. 7 in the form of one mesh line denoting the black section of the document 100. Both arrows 810 collectively define the range over which the terminal 70 carries out the main scanning of the document 100. In the embodiment of the invention, said range corresponds to an N number of bits. Referential numeral 811 indicates a start address of the area 461 of the drum memory 460 supplied with an image signal. Referential numeral 812 denotes an end address of said area 461.

The mark frames 101 and character frames have the prescribed relative positions to the outside frame 106 of the document 100. Therefore, the vertical length of the mark frame and the following character frames is limited. These limited vertical lengths are indicated by $L_1$, $L_2$, $L_3$, $L_4$, $L_5$ which should advisably be chosen to be slightly larger than the vertical lengths of the frames in which marks and characters are actually written. The area of the document 100 in which the code name of a given center is entered is stored in the addresses from $S_1$ to $E_1$ on the drum memory 460. The area of the document 100 in which the handling classification of the document 100 is recorded is stored in the addresses $S_2$ to $E_2$. The same process is applied with respect to the other areas of the document 100. Since the areas 461 of the drum memory 460 are previously known in which the mark patterns and character patterns of the document 100 are stored, the control memory 4461 of the communication control unit 440 can be supplied with the data of the respective groups of addresses $S_1$-$E_1$, $S_2$-$E_2$ ... $S_5$-$E_5$.

Upon receipt of a completion signal through the line 481 and IO port 441, the processor 446 of the communication control unit 440 causes the data of the addresses $S_1$-$E_1$ and a code "1" representing the recognition of a digit to be read out of the control memory 4461 and transmitted to the character recognition unit 42 through the IO port 444. The character recognition unit 42 actuates a read control unit 480, and picks up the contents of the addresses $S_1$-$E_1$ from among an image pattern stored in the drum memory 460 for recognition of a character. The character detection technique used in this case is already known, because it is applied in many OCR's designed to read out only one row of characters entered in the document 100. The character recognition unit 42 recognizes a mark X and the following series of digit patterns row "1234", and returns the result of said recognition in the form of a series of digit codes. The processor 446 of the communication control unit 440 causes the series of the digit codes to be stored as an address data in the control memory 4461 through the IO port 444. If the character recognition unit 42 recognizes the patterns correctly, then the result of said recognition is shown as "1234" in the case of this embodiment.

Thereafter the processor 446 causes the data of the addresses $S_2$-$E_2$ and a code "1" denoting the recognition of a digit to be read out of the control memory 4461 and transmitted to the character recognition unit 42 through the IO port 444. At this time, the character recognition unit 42 carries out the same processing operation as that which has been undertaken with respect to the first line of the document 100. The result of recognition in this case is stored in the control memory 4461 as an indication of the handling classification of the document 100. If the character recognition unit 42 makes a correct recognition, then the result of said recognition is shown as "1110" in the case of this embodiment. The processor 446 reads data on the handling classification 104 of the document 100 out of the control memory 4461. Since, in this case, the first code of said data is represented by "1", the processor 446 finds that the data of the document 100 must be recognized with high precision.

Thereafter, the processor 446 causes the data of the addresses $S_3$-$E_3$ and the second code "1" of the above-mentioned handling classification data 104 of the document 100 to be read out of the control memory 4461 and transmitted to the character recognition unit 42 through the IO port 444. At this time, the character recognition unit 42 makes the same processing operation as on that which has been carried out with respect to the first line of the document 100. The result of recognition in this case is stored in the control memory 4461 as an indication of the first line of the contents of the document 105. If the character recognition unit 42 makes a correct recognition, then the result of said recognition is shown as "2104" in the case of this embodiment.

Next, the processor 446 causes the data of the addresses $S_4$-$E_4$ and the third code "1" of the handling classification data of the document 100 to be read out of the control memory 4461 and transmitted to the character recognition unit 42 through the IO port 444. At this time, the character recognition unit 42 conducts the same processing operation as that which has been carried out with respect to the first line of the contents 105 of the document 100. The result of said operation is stored in the control memory 446 as an indication of the second line of the contents 105 of the document 100. If the character recognition unit 42 makes a correct recognition, then the result of said recognition is shown as "3678" in the case of this embodiment. Since the fourth or last code of the handling classification data 104 of the document 100 is "0", no transmission of data takes place between the recognition control unit 41 and character recognition unit 42. The Japanese characters "東庭提" appearing on the third line of the contents 105 of the document 100 are simply given as a guide for the direct visual confirmation of data by an operator.

When finding from the code of the handling classification data 104 of the document 100 that the characters appearing thereon should be recognized with high precision, then the recognition control unit 41 performs the under-mentioned operation.

Since the second and third codes of the handling classification data 104 of the document 100 are denoted by "1", the processor 446 gives an instruction for the line control unit 447 to be joined with the recognition control unit 51 connected to the switching unit 50. The line control unit 447 causes a code name of the recognition control unit 51 stored in the control memory 4461, for example, "5000" to be automatically dialed by a sending and receiving unit 449. Upon receipt of a response from the recognition control unit 51, the line control unit allows communication to be commenced through a modem 448. In this case, it is assumed that transmission and reception of data between the recognition control units 41, 51 are effected by the ordinary transmission control procedure, for example, a high level data link control system (abbreviated as "HDLC"). Later, the processor 446 causes the data of the addresses $S_3$–$E_3$ of the drum memory 460 to be read out of the control memory 4461 and then stored the contents of addresses $S_3$–$E_3$ in a buffer memory 445 by a read control unit 443. Thereafter, the contents of the addresses $S_4$–$E_4$ of the drum memory 460 are also stored in the buffer memory 445. The processor 446 causes a code name of the recognition control unit 41 stored in the control memory 4461, for example, "4000", a code ("1" in this embodiment) denoting the first line of the contents 105 of the document 100, the second code ("1" in this embodiment) of the handling classification data 104 of the document 100, the contents of the buffer memory 445 corresponding to the addresses $S_3$–$E_3$, a code "2" representing the second line of the contents 105 of the document 100, a third code ("1" in this embodiment) of the handling classification data 104 of the document 100, and the contents of the buffer memory 445 corresponding to the addresses $S_4$–$E_4$ to be transmitted in the order mentioned to the recognition control unit 51 connected to the switching unit 50 through the line control unit 447 and modem 448, and demands the recognition control unit 51 to process all the above-listed data. The processor 446 further causes a reply from the recognition control unit 51 to be stored in the control memory 4461 through the modem 448 and line control unit 447.

Transmission of data is made in the following order:

(i) a code "1" denoting the first line of the contents 105 of the document 100;

(ii) a code series "2104", if an image signal read out of the addresses $S_3$–$E_3$ is correctly recognized;

(iii) a code "2" representing the second line of the contents 105 of the document 100; and (iv) a code series "3678", if an image signal read out of the addresses $S_4$–$E_4$ is correctly recognized.

When the results of recognition by the character recognition unit 42 and those by the character recognition unit 52 are fully stored in the control memory 4461, then said results are read out by the processor 446 for collation, and later are assembled into a message to the receiving center 80 in the control memory 4461. The processor 446 causes an address number "1234" already stored in the control memory 4461 to be read out and instructs the line control unit 447 to establish connection to the receiving center 80 specified by the address number "1234". The line control unit 447 causes the address number "1234" to be automatically dialed by the sending and receiving unit 449. Upon receipt of a response from the center 80, the line control unit 447 causes the final result of recognizing the document 100 to be read out of the control memory 4461 to the center 80. It is assumed in this case that transmission and reception of data between the recognition control unit 41 and center 80 are effected by the ordinary transmission control procedure, for example, the HDLC system.

Figure 9:
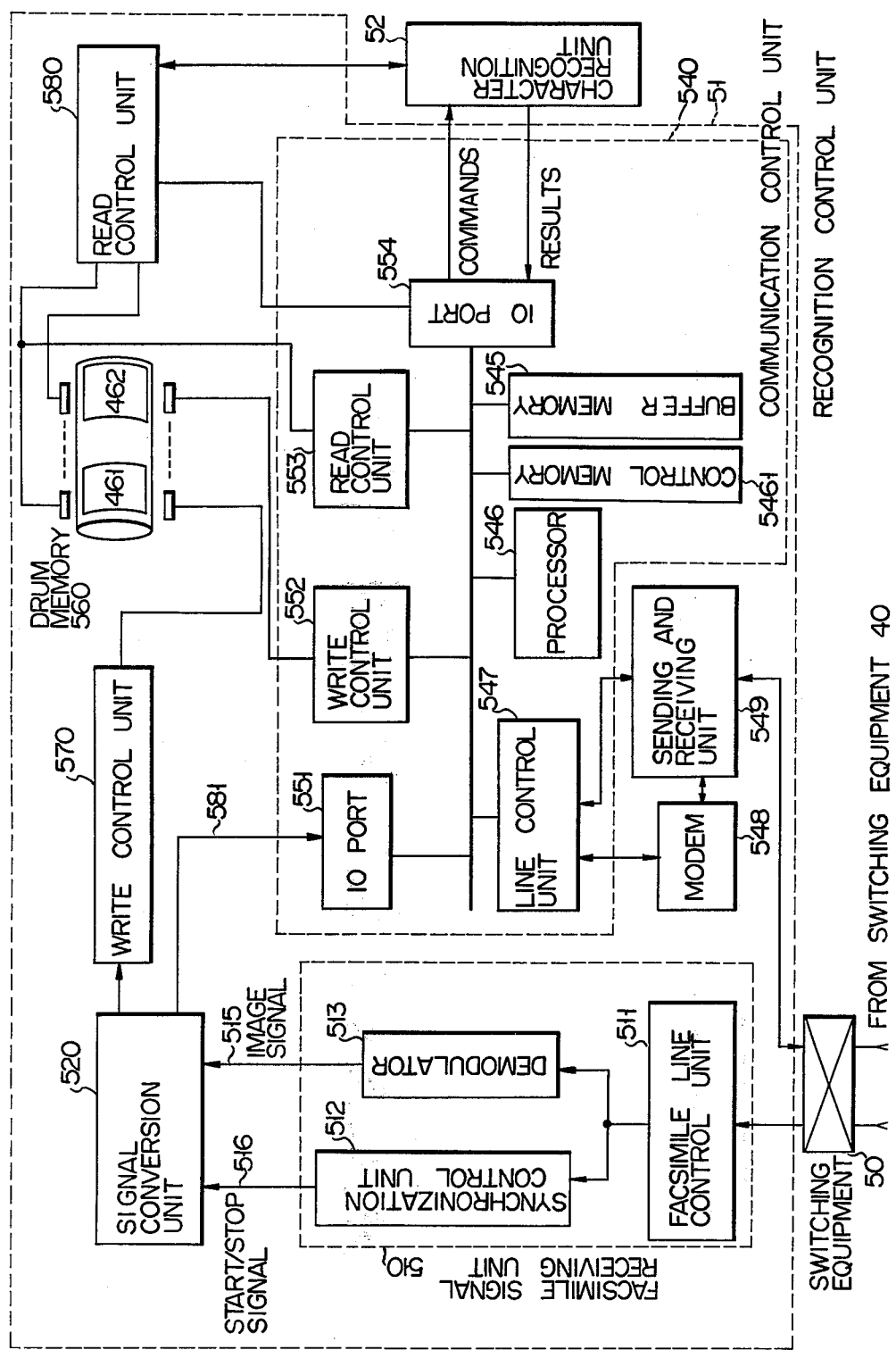
FIG. 9 is a block circuit diagram of a recognition control unit included in the embodiment of the invention, showing the process by which character data is transmitted to and supplied from another recognition control unit.

FIG. 9 is a block diagram for illustrating how a recognition control unit 51 connected to the switching unit 50 operates in response to the request of high precision recognition transferred from a recognition control unit 41 connected to the switching unit 40. Explanation of the construction of the recognition control unit 51 will be omitted here since the construction of it is the same as that of the recognition control unit 41. When receiving a call from the recognition control unit 41, a send and receiving unit 549 produces a response signal and then switches its connection from the switching unit 50 to an MODEM 548. Following this, a processor 546 loads into a control memory 5461 a series of signal codes such as the coded name of the recognition control unit 41, the codes to indicate the lines on the contents area 105 of the document and their corresponding document handling classification codes, transferred from the recognition control unit 41, through the MODEM 548 and a line control unit 547. At the same time, the image signals are successively loaded into an area 562 of a drum memory 560, through a write control unit 552.

When the recognition control unit 51 completes its reception of data from the recognition control unit 41, the processor 546 reads out from the control memory 5461 the head address $S_{11}$ of the area 562 of the drum memory 560 and the addresses $S_3$ and $E_3$ corresponding to the first number (in this example, 1) of the line number of the frame 105 of the document contents received from the recognition control unit 41, executes the calculation $S_{11}+(E_3-S_3)$, and loads the result ($E_{11}$) of the calculation into the control memory 5461. The $E_{11}$ is the end address of the first received image address in the drum memory area 562. Succeedingly, the processor 546 reads out from the control memory 5461 the drum memory addresses $S_{11}$ and $E_{11}$ and the document handling classification (in this example, 1) first received from the recognition control unit 41, and transfers them to a character recognition unit 52, through an IO port. The character recognition unit 52 drives a read control unit 580 to read out the contents of the addresses $S_{11}$ to $E_{11}$ in the area 562 of the drum memory 560, executes its recognition; and returns the result of the recognition to the recognition control unit 51, in the form of a series of codes. The processor 546 stores the codes train through the IO port 544 in the control memory 5461, making them correspond to the line number.

Then, the processor 546 reads out the $E_{11}$, $S_4$ and $E_4$ from the control memory 5461, performs the calculations $E_{11}+1$ and $E_{11}+1+(E_4-S_4)$, and stores the respective results of the calculations as $S_{12}$ and $E_{12}$ in the control memory 5461. The successive operations of the processor 546 is made in order to know the area on the drum memory 560 where the image signal corresponding to the second number (in this example, 2) of the line ones in the contents frame 105 first received from the recognition control unit 41 is stored. The succeeding operation of the processor 546 is to read out from the control memory 5461 the memory addresses $S_{12}$ and $E_{12}$ and the document handling classification (in this example, 1) second received from the recognition control unit 41 and to transfer them to the character recognition unit 52, through the IO port 544. The ensuing operation of the character recognition unit 52 is similar to its operation performed on the first line of the contents of the documents 105. Finally, in this example, when the recognition results of the first and second lines of the contents 105 have been stored in the control memory 5461, the processor 546 transmits the recognition results and their corresponding line numbers of the contents 105 to the recognition control unit 41, through the line control unit 547 and the MODEM 548. In the operation thus far described, it is assumed that the line is reserved from when the recognition control unit 51 is called by the recognition control unit 41 until it returns the results to the latter. In case where, after it receives the signal from the recognition control unit 41, the line is temporarily interrupted, the number (in this example, 4000) transferred from the recognition control unit 41 has been stored in the control memory 5461. In this case, therefore, it may be connected again with the recognition control unit 41 by using the stored number.

The communication control units 440 and 540 are used to control communication between the recognition control units and between the recognition control unit and the center and to control transfer of data and the control information between the recognition control unit and the character recognition unit through multichannel, by the stored program control method. The communication control unit is comprised of the processor, the buffer memory, the control memory, the write and read control units, and the IO port. For example, the signal incoming in series fashion from the line is transformed into the parallel one by the line control unit which is in turn transferred to the buffer memory. The processor receives the data stored in the buffer memory block by block or character by character; it decodes the transmission control code included in the data; and it executes the communication control in a predetermined transmission control procedure. The conventional basic procedure, the HDLC procedure and the like may be used for such transmission control procedure. The program control type communication control unit widely used up to now in data communication is applicable for the communication control unit in this example. The read and write control units of the drum and the IO port may easily be realized by using the technique for connecting various IO (Input and/or Output device) to the bus of the processor.

As described above, the document as shown in FIG. 5 which is inputted from the terminal 70 may be read with a high precision and the document data may be transferred to a desired center (or terminal) by connecting the character recognition units 42 and 52 with recognition ways being complementary each other to the recognition control units 41 and 51, respectively. The above-mentioned example employs two recognition ways; however, three or more ways of recognition may be employed in the embodiment of the invention.

It will be understood from the foregoing description that a high precision character reading is ensured by properly arranging recognition units with complementary character recognition ways in the communication network.

(2) Explanation to follow is the construction to read various kinds of characters and its operation. FIG. 4 will be referred to in the explanation.

Figure 10:
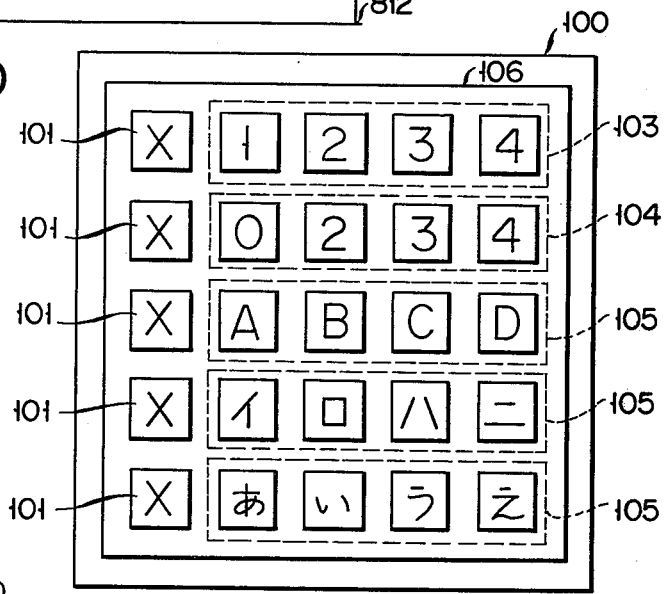
FIG. 10 sets forth a format in which characters are written in a document handled by the embodiment of the invention.

FIG. 10 shows one form of documents used in the example to be described. The document requires to read numerals, alphabetical characters, katakana (Japanese phonetic characters) and hiragana (another Japanese phonetic characters) in an ordinary reading manner (by using one recognition method for each font) and to send the read character to the center 80 represented by 1234. To meet the requirement, the case to be described is that two recognition methods are used being complementary in the font recognition. That is, alphabet and numerals are assigned for the fonts of the character recognition unit 42; katakana and numerals for the recognition unit 52; hiragana and numerals for the recognition unit 62.

Assume now that the document data is transmitted from the terminal 70, such as a facsimile, corresponding to the scanning unit 1 to the center 80. The character recognition units 42, 52 and 62 shown in FIG. 3 correspond to the recognition unit 2 in FIG. 1. The operation of the operator at the terminal 70, the transmission of the image signal of the document 100 to the recognition control unit 41, the loading of it into the drum memory 460, and the recognition of the address area 103 and the handling classification area 104 are similar to those in the case of the high precision read. In FIG. 6, the processor 446 reads out from the control memory 4461 the result of the document handling classification 104 recognized by the character recognition unit 42 (in this example, "0234"). At this time, when the first character code is 0, the document indicates an ordinary read. 2 of the second character code indicates that contents of the documents 105 include an alphabet/numeral train. Therefore, this line may be recognized by the character recognition unit 42. Then, the processor 446 reads out from the control memory 4461 the addresses $S_3$ and $E_3$ referred to in FIG. 8 and the second code 2 of the handling classification and transfers them to the character recognition unit 42, through the IO port 444. The succeeding operation until the recognition result by the character recognition unit 42 is stored in the control memory 4461, is similar to that mentioned in item (1).

Since the third character code of the handling classification 104 is 3, the processor 446 knows that a character train of katakana and numerals is arranged on the second line of the contents of the document 105 and this line may be recognized by the character recognition unit 52. In this case, assume that the information on character sets read by the unit 52 is previously stored in the control memory 4461. The recognition control unit 41 transmits to the recognition control unit 51 the coded name, e.g. 4000, of the recognition control unit 41, the code 2 for indicating the second line of the contents 105, the third code (in this example, 3) of the handling classification, and the image signals included in the addresses till the addresses $S_4$ and $E_4$ referred to in FIG. 8, and receives the recognition result from the recognition unit 52, and loads it into the control memory 4461, as described in item (1). If the result is correct, its contents is the code "イロハニ" of katakana.

From the fact that the fourth character code of the handling classification frame 104 is 4, the processor 446 knows that the third line of the contents of the document 105 includes a character train of hiragana and numerals and hence the line may be recognized by the character recognition unit 62. In this case, this is previously stored in the control memory 4461. Then, the recognition control unit 41 starts to communicate with the recognition control unit 61 (the coded name of the unit 61 is 6000, for example), as mentioned in item (1). Through the communication, it transmits the code 3 for indicating the third line of the contents 105, the fourth code (in this example, 4) of the handling classification, and the image signal included in the addresses till the addresses $S_5$ and $E_5$ as described in FIG. 8, receives the recognition result from the character recognition unit 62 and stores it into the control memory 4461. If the result is correct, its contents are "あいうえ".

The constructions and operations of the recognition control units 51 and 61 are similar to those of the recognition control unit 51 described in item (1).

When the recognition results of the character recognition units 42, 52 and 62 are stored in the control memory 4461 of the recognition control unit 41, the processor 446 constructs a message and transmits it to the center 80 (in this example, 1234) by means similar to that described in item (1).

As seen from the foregoing, with the connection of character recognition units 42, 52 and 62 with different fonts to be recognized to the corresponding recognition control units 41, 51 and 61, the document with various kinds of fonts as shown in FIG. 10 and inputted from the terminal 70, may be read and transmitted to the desired destination 80. In this example, three recognition units are employed; however, the recognition units of more than three may be used, as a matter of course.

As described above, the reading of various kinds of fonts may be performed for many terminals by arranging in the communication network a plurality of recognition units with different fonts to be recognized. Particularly, in case where most of characters on the document fed from the terminal 70 are able to be recognized by the character recognition unit 42 connected to the switching equipment 40 accommodating the terminal, it results in reduction of enquiries to the recognition unit connected to other switching equipment, with the result that the line from the switching equipment 40 to the center 80 is used with an improved efficiency.

(3) This item describes the construction and operation to simultaneously perform two functions referred to in item (2), i.e. the high precision reading and the various fonts reading.

Figure 11:
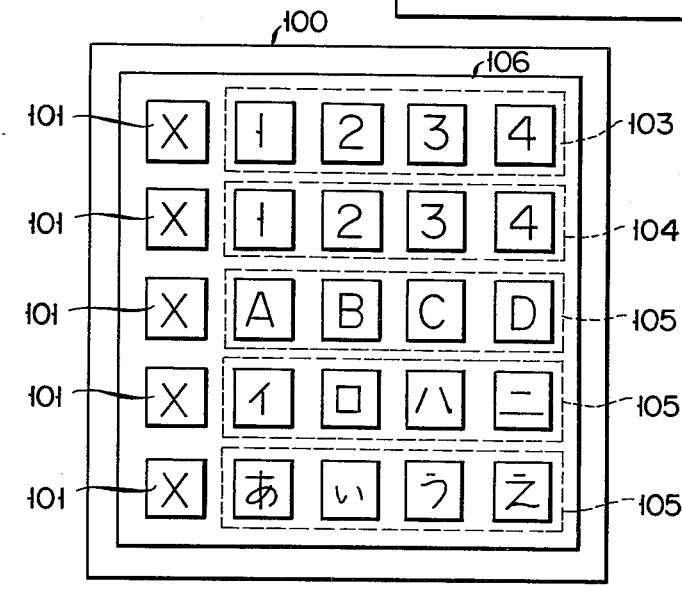
FIG. 11 shows a format in which characters appear in a document handled by the embodiment of the invention.

One form of the documents used in the example to be described is shown in FIG. 11. The document is the same as that shown in FIG. 10, except that it requires the high precision reading (the first character code of the frame 104 is 1). To cope with this, the character recognition unit 42 has numerals, alphabet, katakana and hiragana as its fonts; the unit 52 numerals, alphabet, and katakana; unit 62 numerals and hiragana. On the same font, their character recognition methods are different but complementary.

Figure 1:
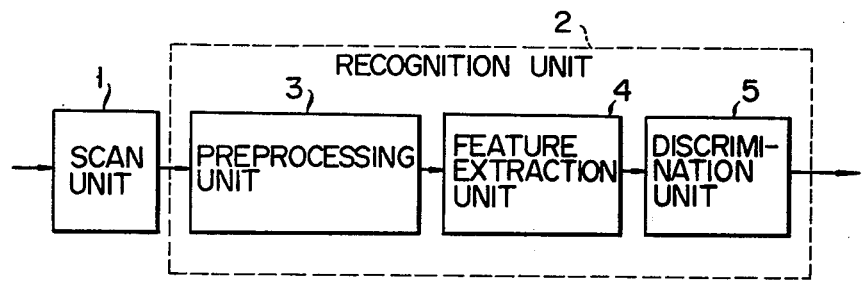
FIG. 1 is a schematic block circuit diagram of the ordinary character reader.

The document information is transferred from the terminal 70, such as a facsimile, corresponding to the scanning unit in FIG. 1 to the center 80. Here, the character recognition units 42, 52 and 62 in FIG. 4 correspond to the recognition unit in FIG. 1. The operation by the operator at the terminal, the transmission of the image signal of the document 100 to the recognition control unit 41, the storing of it into the drum memory 460 and the recognition of the frames 103 and 104, are similar to those mentioned in item (1).

In FIG. 6, the processor 446 reads out from the control memory 4461 the result, e.g. "1234", of the handling classification 104 recognized by the character recognition unit 42, and knows the document must be processed with high precision reading from the fact that the first character code is 1. The processor additionally knows that the second, third and fourth lines may be recognized by the character recognition unit 42. Then, the processor 446 requests the character recognition unit 42 to make a recognition, in the same manner as described in item (1). The difference of the example from the case in item (1) is the contents of the handling classification 104 transmitted from the recognition control unit 41 to the character recognition unit 42. It is "111" in item (1) but "1234" in this example.

The recognition control unit 41 transmits the first and second lines of the contents of the document 105 to the recognition control unit 51 and the third line to the recognition control unit 61, and receives the recognition results from them. The operation at this time will be easily understood from those mentioned in items (1) and (2).

After the recognition results of the character recognition units 42, 52 and 62 are stored in the control memory 4461 of the recognition control unit 41, the processor 446 verifies the character recognition results (two kinds) on respective lines of the contents 105; it constructs a message; and it sends the message to the center 80 (in this example, 1234) by means similar to that described in item (1).

As described above, with connection of the character recognition units 42, 52 and 62 which are different but complementary with respect to recognition manner and the fonts, with the corresponding recognition control units 41, 51 and 61, the document with various fonts as shown in FIG. 11 may be read with a high precision and transmitted to the desired center 80. The number of the recognition units is not limited to three which is employed in this example, with permission of use of larger number of the recognition units.

In the above-mentioned three examples, the terminal serves as a transmitter and the center as a receiver. However, the receiver may be another terminal or an output device provided at the transmitting side.

What we claim is:

1. A character recognition communication system comprising:
    a plurality of terminals, each terminal including a general-purpose facsimile unit having a scanning means for transmitting characters on a document medium as image signals;
    at least one center for receiving a message which includes character codes to thereby effect output processing and data processing; and
    a communication network connected between said message receiving center and said terminals for receiving the image signals from the terminals, recognizing characters, constructing a message according to the result of character recognition and transmitting said message to the message receiving center designated by an address data included in the result of character recognition, said communication network comprising:
    a switching device for switching the image signals from said terminals and transmitting the same to said message receiving center;
    a character recognition unit coupled to said switching device for recognizing characters;
    a recognition control unit coupled between said switching device and said character recognition unit for controlling said character recognition unit to recognize characters from the individual image signals from said terminals, said recognition control unit comprising:
        an image signal receiving unit for receiving said image signals from said terminals and for delivering image signals and control signals necessary to achieve character recognition;
        an image signal converting unit for converting the image signals from said image signal receiving unit to binary output signals, the values of which are controlled by said control signals from said image signal receiving unit, said image signal converting unit generating a completion signal representing completion of conversion of said image signals;
        a memory having addresses any one of which stores said output signals of said image signal converting unit as an image pattern;
        a communication control unit for causing, in response to said completion signal from said image signal converting unit, said character recognition unit to recognize the image pattern stored in an address of said memory, storing the result of image pattern recognition to thereby construct the message, and transmitting the message to the message receiving center designated by an address data included in the result of image pattern recognition; and transmitting and receiving means for operating said switching device to connect said recognition control unit to said terminals or to said message receiving center by means of an interconnecting line.

2. A character recognition communication system comprising:

a plurality of terminals, each terminal including a general-purpose facsimile unit having a scanning means for transmitting characters on a document medium as image signals;

at least one center for receiving a message which includes character codes to thereby effect output processing and data processing; and a communication network connected between said message receiving center and said terminals for receiving the image signals from the terminals, recognizing characters, constructing a message according to the result of character recognition and transmitting said message to the message receiving center designated by an address data included in the result of character recognition, said communication network comprising:

a plurality of switching devices scattered in said communications network for connecting said terminals to said message receiving center;

a plurality of interconnecting lines for connecting said switching devices to one another;

a plurality of character recognition units coupled to said switching devices, respectively, said character recognition units including means for recognizing various kinds of characters in different methods; and a plurality of recognition control units coupled between the respective switching devices and the respective character recognition units for controlling the respective character recognition units to recognize characters from the individual image signals from said terminals and to thereby effect a high precision character recognition and/or a recognition of characters of different kinds, each of said recognition control units comprising:

an image signal receiving unit for receiving said image signals from the switching device connected to the recognition control unit and for delivering image signals and control signals necessary to achieve character recognition;

an image signal converting unit for converting the image signals from said image signal receiving unit to binary output signals, the values of which are controlled by said control signals from said image signal receiving unit, said image signal converting unit generating a completion signal representing completion of conversion of said image signals;

a memory having addresses any one of which stores said output signals of said image signal converting unit as an image pattern, a communication control unit for causing, in response to said completion signal from said image signal converting unit, said character recognition unit to recognize the image pattern stored in an address of said memory, storing the result of image pattern recognition, transmitting the image pattern in response to the codes of the result of pattern recognition to the character recognition unit connected via another recognition control unit to the switching device which is connected by an interconnecting line to the switching device connected to said recognition control unit, receiving the result of image pattern recognition obtained by another character recognition unit, comparing and/or combining the results of image pattern recognition obtained by the two character recognition units, storing the final result of image pattern recognition, and constructing the message and transmitting said constructed message to the message receiving center designated by an address data included in the final result of image pattern recognition; and transmitting and receiving means for operating said switching unit to connect said recognition control unit to said terminals or to said message receiving centers by means of an interconnecting line.

3. The character recognition communication system of claim 2, wherein each of said communication control units includes a memory means for previously storing codes indicating the handling classification of a document medium and the kinds of characters recognizable by the corresponding character recognition unit and the other character recognition units.

4. The character recognition communication system of claim 3, wherein said memory means stores a code indicating a high precision character recognition after said character recognition unit has finished recognizing an image pattern.

5. The character recognition communication system of claim 4, wherein said character recognition units recognize characters of the same kind in different methods when said memory means stores the code indicating a high precision character recognition.

6. The character recognition communication system of claim 3, wherein said memory means stores a code indicating a recognition of characters of various kinds after said character recognition unit has finished recognizing an image pattern.

7. The character recognition communication system of claim 6, wherein said character recognition units recognize characters of different kinds when said memory means stores the code indicating a recognition of characters of various kinds.

* * * * *